(12) United States Patent
Zhou et al.

(10) Patent No.: US 9,351,294 B2
(45) Date of Patent: May 24, 2016

(54) METHOD FOR SENDING CONTROL INFORMATION AND BASE STATION

(71) Applicant: Huawei Technologies Co., Ltd., Shenzhen (CN)

(72) Inventors: Huan Zhou, Shenzhen (CN); Xueli Ma, Shanghai (CN); Meng Hua, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 121 days.

(21) Appl. No.: 14/313,562

(22) Filed: Jun. 24, 2014

(65) Prior Publication Data

US 2014/0307673 A1 Oct. 16, 2014

Related U.S. Application Data

(63) Continuation of application No. PCT/CN2012/085316, filed on Nov. 27, 2012.

(30) Foreign Application Priority Data

Dec. 26, 2011 (CN) .......................... 2011 1 0441158
Jul. 25, 2012 (CN) .......................... 2012 1 0258788

(51) Int. Cl.
*H04W 72/04* (2009.01)
*H04L 1/00* (2006.01)

(52) U.S. Cl.
CPC ........... *H04W 72/042* (2013.01); *H04L 1/0072* (2013.01); *H04L 1/0067* (2013.01)

(58) Field of Classification Search
CPC .................................................. H04W 72/042
See application file for complete search history.

(56) References Cited

U.S. PATENT DOCUMENTS

| 7,149,207 | B2 | 12/2006 | Okumura et al. |
| 8,458,559 | B2 * | 6/2013 | Siew ..................... H04L 1/0079 370/329 |
| 8,626,177 | B2 * | 1/2014 | Yoon ................... H04L 27/3488 375/267 |
| 2004/0085989 | A1 * | 5/2004 | Boumendil ....... H03M 13/2796 370/442 |
| 2004/0264507 | A1 | 12/2004 | Cho et al. |

(Continued)

FOREIGN PATENT DOCUMENTS

| CN | 101316378 A | 12/2008 |
| CN | 101860424 A | 10/2010 |

(Continued)

OTHER PUBLICATIONS

3rd Generation Partnership Project; Technical Specification Group Radio Access Network; Multiplexing and channel coding (FDD) (Release 11), 3GPP TS 25.212, V11.0.0, Dec. 2011, 129 pages.

(Continued)

*Primary Examiner* — Rasheed Gidado
(74) *Attorney, Agent, or Firm* — Slater Matsil, LLP

(57) ABSTRACT

Embodiments of the present invention provide a method for sending control information and a base station. The method includes performing rate matching on a coded sequence obtained by performing channel coding on second control information to obtain a symbol sequence. The second control information includes bit information indicating layer number information. The method also includes sending the symbol sequence to a user equipment (UE) over a high speed shared control channel (HS-SCCH).

18 Claims, 5 Drawing Sheets

(56) References Cited

U.S. PATENT DOCUMENTS

| | | |
|---|---|---|
| 2006/0268882 A1 | 11/2006 | Mademann |
| 2008/0212608 A1 | 9/2008 | Haikola et al. |
| 2008/0225966 A1 | 9/2008 | Tseng et al. |
| 2009/0073922 A1* | 3/2009 | Malladi ............... H04L 1/0004 370/328 |
| 2009/0285193 A1* | 11/2009 | Kim ..................... H04L 5/0007 370/342 |
| 2010/0135181 A1* | 6/2010 | Earnshaw ............. H04W 28/06 370/252 |
| 2010/0239040 A1* | 9/2010 | Beluri ................. H04B 7/0417 375/267 |

FOREIGN PATENT DOCUMENTS

| | | |
|---|---|---|
| CN | 101960736 A | 1/2011 |
| DE | 69632560 T2 | 8/2005 |
| EP | 0735712 A2 | 10/1996 |
| EP | 2068488 A2 | 6/2009 |
| RU | 2289210 C2 | 12/2006 |
| RU | 2350045 C2 | 3/2009 |
| WO | 2009107985 A1 | 9/2009 |
| WO | 2010107699 A2 | 9/2010 |
| WO | 2011041492 A2 | 4/2011 |
| WO | 2011123747 A1 | 10/2011 |
| WO | 2014021756 A1 | 2/2014 |

OTHER PUBLICATIONS

Ericsson, "Rate Matching for HS-SCCH Part I for Four Branch MIMO System," 3GPP TSG-RAN WG1 #70, R1-12XXXX, Qingdao, P.R. of China, Aug. 13-17, 2012, 7 pages.

Ericsson, "HS-SCCH structure for MIMO and 64QAM," 3GPP TSG-RAN WG1 #47bis, R1-070535, Sorrento, Italy, Feb. 15-19, 2007, 3 pages.

Ericsson, "HS-SCCH orders in MIMO mode," 3GPP TSG-RAN WG1 Meeting #49, R1-072491, Kobe, Japan, May 7-11, 2007, 13 pages.

Nokia Siemens Networks, "Standardisation of 4 antenna MIMO for HSPA+," 3GPP TSG-RAN WG1 Meeting #66bis, R1-113412, Zhuhai, China, Oct. 10-14, 2011, 3 pages.

* cited by examiner

| xccs,1 | | | xccs,2 | | | xccs,3 | | | xccs,4 | | | xccs,5 | | | xccs,6 | | | xccs,7 | | |
|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 | 21 |
| xms,1 | | | xms,2 | | | xms | | | xlni,1 | | | xlni,2 | | | xpwipb,1 | | | xpwipb,4 | | |
| 22 | 23 | 24 | 25 | 26 | 27 | 28 | 29 | 30 | 31 | 32 | 33 | 34 | 35 | 36 | 37 | 38 | 39 | 40 | 41 | 42 |
| 0 | | | 0 | | | 0 | | | 0 | | | 0 | | | 0 | | | 0 | | |
| 43 | 44 | 45 | 46 | 47 | 48 | 49 | 50 | 51 | 52 | 53 | 54 | 55 | 56 | 57 | 58 | 59 | 60 | 61 | 62 | 63 |
| 0 | | | | | | | | | | | | | | | | | | | | |
| 64 | 65 | 66 | | | | | | | | | | | | | | | | | | |

FIG. 2B

Increase modulation and data block information in a first part of first control information from 3 bits to 5 bits for jointly indicating a modulation mode and layer number information, to obtain a first part of second control information, and use a second part of the first control information as a second part of the second control information — 301

Remove signs of a first number from a coded sequence obtained by performing channel coding on the first part of the second control information, to obtain a first part sign sequence in a sign sequence, where the first number is a sum of the number of signs removed from a coded sequence obtained by performing channel coding on the first part of the first control information and an x2 matching rate — 302

Remove signs of a second number from a coded sequence obtained by performing channel coding on the second part of the second control information, to obtain a second part sign sequence in the sign sequence, where the second number is the number of signs removed from a coded sequence obtained by performing channel coding on the second part of the first control information — 303

Send the first part sign sequence and the second part sign sequence of the sign sequence to the UE over an HS-SCCH — 304

FIG. 3

Add two bits for indicating layer number information to a first part of first control information for indicating layer number information, and increase precoding weight information in the first part of the first control information from two bits to four bits, to obtain a first part of second control information, and use a second part of the first control information as a second part of the second control information ⟵ 401

If the first part of the second control information uses a 1/3 rate convolutional code, remove signs of a third number from a coded sequence obtained by performing channel coding on the first part of the second control information, to obtain a first part sign sequence of a sign sequence, where the third number is a sum of the number of signs removed from a coded sequence obtained by performing channel coding on the first part of the first control information and an x4 matching rate; and if the first part of the second control information uses a 1/2 rate convolutional code, remove 8 signs from a coded sequence obtained by performing channel coding on the first part of the second control information, to obtain a first part sign sequence of a sign sequence ⟵ 402

Remove signs of a second number from a coded sequence obtained by performing channel coding on the second part of the second control information, to obtain a second part sign sequence in a sign sequence ⟵ 403

Send the first part sign sequence and the second part sign sequence of the sign sequence to a UE over an HS-SCCH ⟵ 404

FIG. 4A

| xccs,1 | | | xccs,2 | | | xccs,3 | | | xccs,4 | | | xccs,5 | | | xccs,6 | | | xccs,7 | | |
|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 | 21 |
| xms,1 | | | xms,2 | | | | | | xlni,1 | | | xlni,2 | | | xpwipb,1 | | | xpwipb,4 | | |
| 22 | 23 | 24 | 25 | 26 | 27 | 28 | 29 | 30 | 31 | 32 | 33 | 34 | 35 | 36 | 37 | 38 | 39 | 40 | 41 | 42 |
| 0 | | | 0 | | | 0 | | | 0 | | | 0 | | | 0 | | | 0 | | |
| 43 | 44 | 45 | 46 | 47 | 48 | 49 | 50 | 51 | 52 | 53 | 54 | 55 | 56 | 57 | 58 | 59 | 60 | 61 | 62 | 63 |
| 0 | | | 0 | | | 0 | | | | | | | | | | | | | | |
| 64 | 65 | 66 | 67 | 68 | 69 | 70 | 71 | 72 | | | | | | | | | | | | |

FIG. 4B

| xccs,1 | | xccs,2 | | xccs,3 | | xccs,4 | | xccs,5 | | xccs,6 | | xccs,7 | |
|---|---|---|---|---|---|---|---|---|---|---|---|---|---|
| 1 | 2 | 3 | 4 | 5 | 6 | 7 | 8 | 9 | 10 | 11 | 12 | 13 | 14 |
| xms,1 | | xms,2 | | xms,3 | | xlni,1 | | xlni,2 | | xpwipb,1 | | xpwipb,2 | |
| 15 | 16 | 17 | 18 | 19 | 20 | 21 | 22 | 23 | 24 | 25 | 26 | 27 | 28 |
| xpwipb,3 | | xpwipb,4 | | 0 | | 0 | | 0 | | 0 | | 0 | |
| 29 | 30 | 31 | 32 | 33 | 34 | 35 | 36 | 37 | 38 | 39 | 40 | 41 | 42 |
| 0 | | 0 | | 0 | | | | | | | | | |
| 43 | 44 | 45 | 46 | 47 | 48 | | | | | | | | |

501 — Increase modulation and data block information in a first part of first control information from three bits to five bits for jointly indicating a modulation mode and layer number information, and increase precoding weight information in the first part of the first control information from two bits to four bits, to obtain a first part of second control information, and use a second part of the first control information as a second part of the second control information 502 — If a 1/3 rate convolutional code is used, remove signs of a third number from a coded sequence obtained by performing channel coding on the first part of the second control information, to obtain a first part sign sequence of a sign sequence; and if a 1/2 rate convolutional code is used, remove eight signs from a coded sequence obtained by performing channel coding on the first part of the second control information, to obtain a first part sign sequence of a sign sequence 503 — Remove signs of a second number from a coded sequence obtained by performing channel coding on the second part of the second control information, to obtain a second part sign sequence in a sign sequence 504 — Send the first part sign sequence and the second part sign sequence of the sign sequence to a UE over an HS-SCCH

FIG. 5

METHOD FOR SENDING CONTROL INFORMATION AND BASE STATION

This application is a continuation of International Application No. PCT/CN2012/085316, filed on Nov. 27, 2012, which claims priority to Chinese Patent Application No. 201110441158.9, filed on Dec. 26, 2011 and Chinese Patent Application No. 201210258788.7, filed on Jul. 25, 2012, all of which are hereby incorporated by reference in their entireties.

TECHNICAL FIELD

The present invention relates to radio communications technologies and, in particular embodiments, to a method for sending control information and a base station.

BACKGROUND

With the development of communication technologies, more and more new technologies emerge, and wideband code division multiple access (WCDMA) is a third generation radio communication system which is most widely applied at present. How to evolve a WCDMA system to satisfy users' requirements for high speed uplink and downlink data transmission is the most important research work in the field of radio communications. Since R5, a series of important technologies are introduced into WCDMA to improve an uplink and downlink data transmission rate: high speed downlink packet access (HSDPA), high speed uplink packet access (HSUPA), multiple-input multiple-output (MIMO), and 64-phase quadrature amplitude modulation (QAM).

At present, MIMO in high speed data access (High Speed Packet Access, HSPA) is dual-transmitting antenna MIMO. A scheduled UE has a maximum of two transport blocks, namely, a primary transport block and a secondary transport block, where the secondary transport block is for optional transmission. The two transport blocks undergo a processing process of a transport channel, spectrum spreading, scrambling, and precoding operation, and then are sent together with a common pilot channel (CPICH) on two transmitting antennas, thereby cancelling interference between the antennas by precoding. A base station (NodeB) needs to notify a user equipment (UE) of control information of a high speed physical downlink shared channel (HS-PDSCH), so that the UE receives the HS-PDSCH. The control information includes a code channel number, the number of code channels, a modulation scheme, precoding, the size and the number of transport blocks, redundancy and constellation version, and the like. Such control information is borne over a high speed shared control channel (HS-SCCH). A downlink MIMO control channel uses an HS-SCCH type (type) 3 format, and different numbers of data blocks correspond to different formats.

An HS-SCCH type 3 format includes the following information in cases of one data block (a single code word for short):

channelization-code-set information (Channelization-code-set information): seven bits (bit) in total, which respectively are: xccs,1, xccs,2, . . . , xccs,7;

modulation and data block information (Modulation scheme and number of transport blocks information): three bits in total, which respectively are: xms,1, xms,2, xms,3;

precoding weight information (Precoding weight information): two bits in total, which respectively are: xpwipb,1, xpwipb,2;

transport-block size information (Transport-block size information): six bits in total, which respectively are: xtbspb,1, xtbspb,2, . . . , xtbspb,6;

hybrid automatic repeat request process information ((Hybrid Automatic Repeat Request, Hybrid-ARQ) process information): four bits in total, which respectively are: xhap,1, xhap,2, . . . , xhap,4;

redundancy and constellation version (Redundancy and constellation version): two bits in total, which respectively are: xrvpb,1, xrvpb,2; and UE identity (UE identity): 16 bits in total, which respectively are: xue,1, xue,2, . . . , xue,16.

An HS-SCCH type 3 format includes the following information in cases of two data blocks (a dual-code word for short):

channelization-code-set information (Channelization-code-set information): seven bits in total, which respectively are: xccs,1, xccs,2, . . . , xccs,7;

modulation and data block information (Modulation scheme and number of transport blocks information): three bits in total, which respectively are: xms,1, xms,2, xms,3;

precoding weight information (Precoding weight information for the primary transport block): two bits in total, which respectively are: xpwipb,1, xpwipb,2;

transport-block size information for the primary transport block (Transport-block size information for the primary transport block): six bits in total, which respectively are: xtbspb,1, xtbspb,2, . . . , xtbspb,6;

transport-block size information for the secondary transport block (Transport-block size information for the secondary transport block): six bits in total, which respectively are: xtbssb,1, xtbssb,2, . . . , xtbssb,6;

hybrid automatic repeat request process information (Hybrid-ARQ process information): four bits in total, which respectively are: xhap,1, xhap,2, . . . , xhap,4;

redundancy and constellation version for the primary transport block (Redundancy and constellation version for the primary transport block): two bits in total, which respectively are: xrvpb,1, xrvpb,2;

redundancy and constellation version for the secondary transport block (Redundancy and constellation version for the secondary transport block): two bits in total, which respectively are: xrvsb,1, xrvsb,2; and UE identity (UE identity): 16 bits in total, which respectively are: xue,1, xue,2, . . . , xue,16.

The channelization-code-set information, modulation and data block information, and precoding weight information are sent in time slot 1, and are referred to as part 1 (Part1) of control information; the remaining ones are sent in time slot 2 and time slot 3, and are referred to as part 2 (part2) of the control information.

After the research of several versions, the improving the transmission efficiency of a radio channel reaches a bottleneck. In order to satisfy users' requirements and to meet a challenge of other technologies, it is considered to introduce multiple-antenna (more than 2) MIMO operation into a down link in a WCDMA system, thereby further improving cell throughput. In multiple-antenna MIMO, one data block may be divided into multiple layers by layer mapping, where different precoding is performed on data of each layer, and then the data is sent by using spatially separated antennas, thereby further obtaining a gain of space diversity. Layer number information in the multiple-antenna MIMO needs to be notified by a base station (NodeB) to a user equipment (UE), which, however, cannot be implemented in the prior art.

SUMMARY

The present invention provides a method for sending control information and a base station, which are used for sending layer number information in multiple-antenna MIMO to a UE.

One aspect of the present invention provides a method for sending control information. Bit information indicating layer number information is added to first control information, to obtain second control information. Rate matching is performed on a coded sequence obtained by performing channel coding on the second control information, to obtain a symbol sequence. The symbol sequence is sent to a user equipment (UE) over a high speed shared control channel (HS-SCCH).

Another aspect of the present invention provides a base station. A first information obtaining module is configured to add bit information indicating layer number information to first control information, to obtain second control information. A first code processing module is configured to perform channel coding on the second control information to obtain a coded sequence. A first rate matching module is configured to perform rate matching on the coded sequence to obtain a symbol sequence. A first sending module is configured to send the symbol sequence to a user equipment (UE) over a high speed shared control channel (HS-SCCH).

In the method for sending control information and the base station provided in one aspect of the present invention, by adding bit information indicating layer number information to control information, and performing channel coding, rate matching, and the like on the control information to which the bit information indicating the layer number information is added, a symbol sequence is obtained, and then the obtained symbol sequence is sent to a UE over an HS-SCCH, thereby notifying the UE of the layer number information.

In the method for sending control information and the base station provided in another aspect of the present invention, by adding a bit number of precoding weight information, the problem that more bits are required for indication because the number of antennas and the number of layers mapped to transport blocks are increased is solved, and a NodeB is allowed to perform precoding processing on a data block by using more weight information.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 2B is a schematic diagram of a first part symbol sequence of second control information according to Embodiment 2 of the present invention;

FIG. 3 is a flowchart of a method for sending control information according to Embodiment 3 of the present invention;

FIG. 4A is a flowchart of a method for sending control information according to Embodiment 4 of the present invention;

FIG. 4B is a schematic diagram of a first part symbol sequence of second control information according to Embodiment 4 of the present invention;

FIG. 4C is another schematic diagram of a first part symbol sequence of second control information according to Embodiment 4 of the present invention;

FIG. 5 is a flowchart of a method for sending control information according to Embodiment 5 of the present invention.

DETAILED DESCRIPTION OF ILLUSTRATIVE EMBODIMENTS

To make the objectives, technical solutions, and advantages of the embodiments of the present invention more comprehensible, the following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
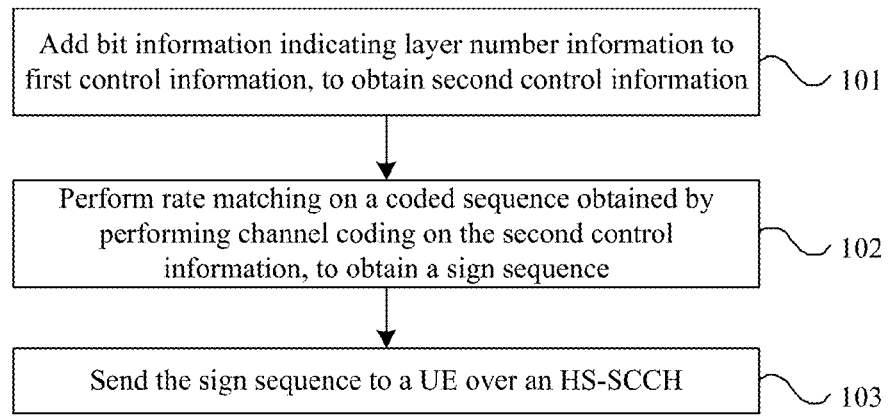
FIG. 1 is a flowchart of a method for sending control information according to Embodiment 1 of the present invention.

FIG. 1 is a flowchart of a method for sending control information according to Embodiment 1 of the present invention. As shown in FIG. 1, the method according to this embodiment includes the following steps.

Step 101: Add bit information indicating layer number information to first control information, to obtain second control information.

In embodiments of the present invention, the first control information refers to control information of an HS-PDSCH in an existing WCDMA system. In an existing WCDMA system, the first control information is borne over the HS-SCCH and is in an HS-SCCH type 3 format. If a UE uses a single-code word, the first control information includes the following information: channelization-code-set information, modulation and data block information, precoding weight information, transport-block size information, hybrid automatic repeat request process information, redundancy and constellation version, and UE identity. If a UE uses a dual-code word, the first control information includes the following information: channelization-code-set information, modulation and data block information, precoding weight information, transport-block size information for the primary transport block, transport-block size information for the secondary transport block, hybrid automatic repeat request process information, redundancy and constellation version for the primary transport block, redundancy and constellation version for the secondary transport block, and UE identity.

The channelization-code-set information, modulation and data block information, and precoding weight information is sent in time slot 1 as a first part of the first control information, and the remaining information is sent in time slot 2 and time slot 3 as a second part of the first control information.

In this embodiment, a NodeB adds the bit information indicating layer number information to the first control information, and carries the layer number information mapped to a data block in a multiple-antenna (more than two) MIMO system by using the additional bits, to obtain the second control information. The layer number information includes the number of layers and/or a layer number to which a data block is specifically mapped.

Compared with the first control information, the second control information has the additional bit information indicating the layer number information.

Step 102: Perform rate matching on a coded sequence obtained by performing channel coding on the second control information, to obtain a symbol sequence.

The NodeB, after obtaining the second control information, performs channel coding on the second control information, and then performs rate matching on the coded sequence obtained by performing channel coding to obtain the symbol sequence. Because the second control information includes the bit information indicating the layer number information, the obtained symbol sequence carries information indicating the layer number information.

Step 103: Send the symbol sequence to a UE over an HS-SCCH.

The NodeB bears the symbol sequence over the HS-SCCH to send the symbol sequence to the UE. Because the symbol sequence carries the information indicating the layer number information, the UE may learn the layer number information mapped to the data block in the multiple-antenna MIMO by using the symbol sequence received over the HS-SCCH.

In the method for sending control information according to this embodiment, a NodeB, by adding bit information indicating layer number information to control information, and performing channel coding, rate matching, and the like on the control information to which the bit information indicating the layer number information is added, obtains a symbol sequence, and then sends the obtained symbol sequence to a UE over an HS-SCCH, thereby notifying the UE of the layer number information, and laying a foundation for implementing a multiple-antenna MIMO technology.

Correspondingly, a UE will receive second control information carrying the layer number information, and parse the second control information, to obtain the layer number information from the second control information. Meanwhile, the UE will also obtain other information such as channelization-code-set information, modulation and data block information, and precoding weight information from the second control information. Then, the UE receives an HS-PDSCH according to the information obtained from the second control information. The way in which the UE receives the second control information and parses the second control information to obtain the information from the second control information is similar to the way in the prior art in which the UE receives the first control information and performs parsing processing on the first control information, and is not described in detail herein again.

The adding the bit information indicating the layer number information to the first control information may be implemented in multiple manners. Some of the implementation manners will be described in the following embodiments.

Figure 2A:
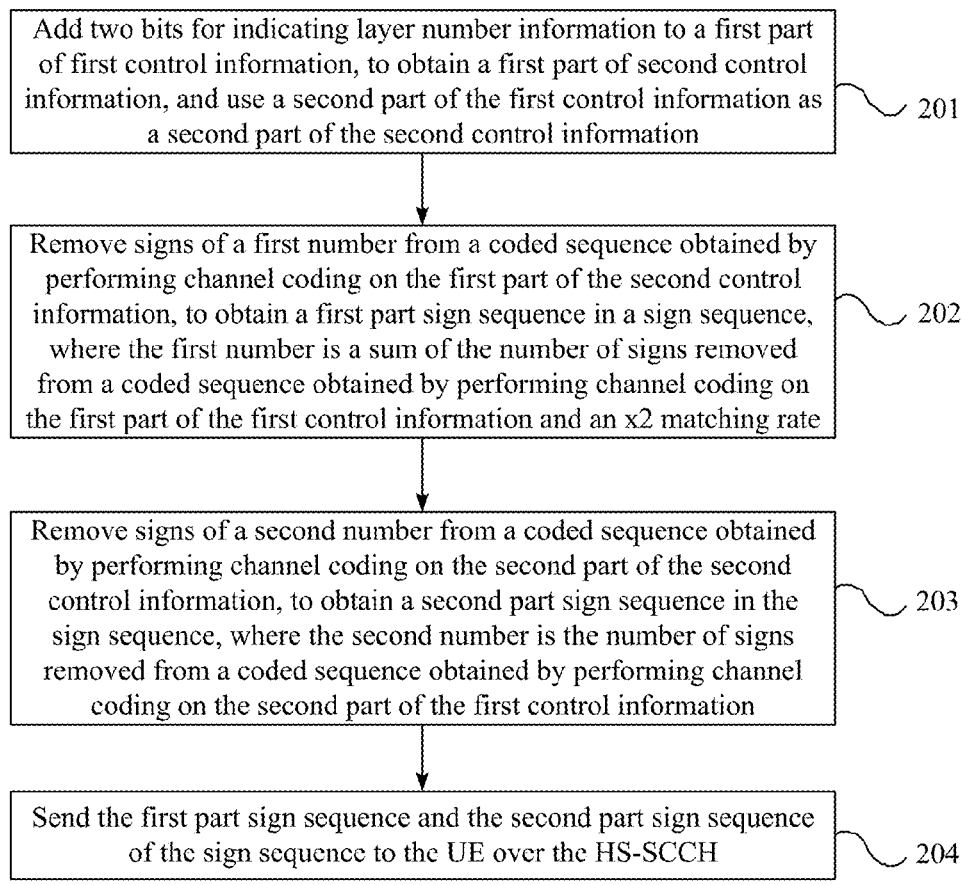
FIG. 2A is a flowchart of a method for sending control information according to Embodiment 2 of the present invention.

FIG. 2A is a flowchart of a method for sending control information according to Embodiment 2 of the present invention. As shown in FIG. 2A, the method according to this embodiment includes the following steps.

Step 201: Add two bits for indicating layer number information to a first part of first control information, to obtain a first part of second control information, and use a second part of the first control information as a second part of the second control information.

In this embodiment, a NodeB adds two bits to the first part of the first control information, thereby representing, by using the two additional bits, the number of layers to which a data block in multiple-antenna MIMO may be mapped and a layer number to which it is mapped. In this embodiment, the added indication layer number information is recorded as xlni,1 and xlni,2. An implementation manner for representing the layer number information by using the newly added xlni,1 and xlni,2 is shown in Table 1.

TABLE 1

| Mapping Layer Number (Layer Number) | Value of Newly Added Bit |
|---|---|
| 1 | 00 |
| 2 | 01 |
| 3 | 10 |
| 4 | 11 |

In addition, according to Table 1, it can be known that the number of layers is 4.

The NodeB uses the first part to which xlni,1 and xlni,2 are added in the first control information as the first part of the second control information. The NodeB directly uses the second part of the first control information as the second part of the second control information.

Based on the above description, in this embodiment, the first part of the second control information includes channelization-code-set information, modulation and data block information, precoding weight information, and two bits indicating layer number information. The second part of the second control information is the same as the second part of the first control information. If a UE uses a single-code word, the second part of the second control information includes transport-block size information, hybrid automatic repeat request process information, redundancy and constellation version, and UE identity; if the UE uses a dual-code word, the second part of the second control information includes transport-block size information for the primary transport block, transport-block size information for the secondary transport block, hybrid automatic repeat request process information, redundancy and constellation version for the primary transport block, redundancy and constellation version for the secondary transport block, and UE identity.

Step 202: Remove a first number of symbols from a coded sequence obtained by performing channel coding on the first part of the second control information, to obtain a first part symbol sequence in a symbol sequence, where the first number is a sum of the number of symbols removed from a coded sequence obtained by performing channel coding on the first part of the first control information and 2 times matching rate.

After obtaining the second control information, the NodeB respectively processes the first part and the second part of the second control information.

Specifically, the NodeB first performs channel coding on the first part of the second control information to obtain a coded sequence. In the embodiments of the present invention, a channel coding scheme used for the first part is a convolutional coding scheme, such as ⅓ rate convolutional coding scheme.

Then, the NodeB performs rate matching processing on the coded sequence to obtain a first part symbol sequence corresponding to the second control information, where the rate matching is to puncture data after channel coding (that is, the coded sequence in this embodiment) or to repeat the data, so that the coded sequence after rate matching may meet a requirement of the channel for the number of symbols. For example, for the HS-SCCH, 40 symbols are required after part 1 and 80 symbols are required after part 2; however, the coded sequence in this embodiment obviously exceeds the specified length, and puncturing processing needs to be performed. A matching rate used in rate matching processing depends on the HS-SCCH. In the embodiments of the present invention, the matching rate equals to a channel coding rate. If ⅓ rate convolutional coding is used, the matching rate is 3.

The process of performing rate matching on the coded sequence of the first part of the second control information is similar to the process of performing rate matching on the coded sequence of the first part of the first control information, that is, to remove or puncture partial symbols from the coded sequence of the first part of the second control information. However, compared with the first part of the first control information, two bits are added to the first part of the second control information; therefore, to ensure that the symbol sequence obtained by performing rate matching meets the requirement of the HS-SCCH for the number of symbols, compared with the process of performing rate matching on the coded sequence of the first part of the first control information, when performing rate matching on the coded sequence of the first part of the second control information, 2*3=6 more symbols need to be removed (in other words, six more symbols need to be punctured). That is, if n symbols need to be punctured from the coded sequence of the first part of the first control information, (n+6) symbols need to be punctured from the coded sequence of the first part of the second control information. In the embodiments of the present invention, the number (n+6) is recorded as a first number, where the first number is a sum of the number of symbols removed in the process of performing rate matching on the coded sequence of the first part of the first control information and 2 times matching rate.

In this embodiment, no limitation is set to symbols which are specifically removed by the NodeB from the coded sequence of the first part of the second control information as long as symbols of the first number are removed. This embodiment provides an exemplary implementation manner, which specifically is: the NodeB removes symbols 1, 2, 4, 6, 8, 12, 15, 18, 21, 24, 27, 30, 33, 36, 39, 41, 43, 46, 49, 52, 55, 59, 61, 63, 65, and 66 from the coded sequence of the first part of the second control information, to obtain a first part symbol sequence shown in FIG. 2B. In FIG. 2B, symbols highlighted in gray are removed symbols. If the coded sequence of the first part of the second control information is recorded as $z_{1,1}$, $z_{1,2}$, ..., $z_{1,66}$, the NodeB punctures $z_{1,1}$, $z_{1,2}$, $z_{1,4}$, $z_{1,6}$, $z_{1,8}$, $z_{1,12}$, $z_{1,15}$, $z_{1,18}$, $z_{1,21}$, $z_{1,24}$, $z_{1,27}$, $z_{1,30}$, $z_{1,33}$, $z_{1,36}$, $z_{1,39}$, $z_{1,41}$, $z_{1,43}$, $z_{1,46}$, $z_{1,49}$, $z_{1,52}$, $z_{1,55}$, $z_{1,59}$, $z_{1,61}$, $z_{1,63}$, $z_{1,65}$, and $z_{1,66}$.

Step 203: Remove a second number of symbols from a coded sequence obtained by performing channel coding on the second part of the second control information, to obtain a second part symbol sequence in a symbol sequence, where the second number is the number of symbols removed from a coded sequence obtained by performing channel coding on the second part of the first control information.

Specifically, the NodeB first adds cyclic redundancy check (Cyclic Redundancy Check, CRC) information to the second part of the second control information, so that the UE performs CRC on received control information. CRC information is 16 bits. Then, the NodeB performs channel coding on the second part of the second control information to which the CRC information is added, to obtain a coded sequence. In the embodiments of the present invention, a channel coding scheme used for the second part is a convolutional coding scheme.

Then, the NodeB performs rate matching on the coded sequence to obtain the second part symbol sequence. The process of performing rate matching on the coded sequence of the second part of the second control information is the same as the process of performing rate matching on the coded sequence of the second part of the first control information, that is, the number of symbols removed or punctured and positions of the symbols removed or punctured from the coded sequence of the second part of the second control information are the same as those of the second part of the first control information, which is not described repeatedly herein.

In the embodiments of the present invention, the number of symbols removed in the process of performing rate matching on the coded sequence of the second part of the first control information is recorded as a second number.

Step 204: Send the first part symbol sequence and the second part symbol sequence of the symbol sequence to the UE over the HS-SCCH.

The NodeB, after obtaining the first part symbol sequence, further includes an operation of adding a mask code (exclusive-or) on a sequence obtained by performing puncturing processing after ½ convolutional coding by using a 16-bit UE identity and the first part symbol sequence, so that the UE correctly differentiates control information belonging thereto on the HS-SCCH.

Then, the NodeB maps the first part symbol sequence and the second part symbol sequence corresponding to the second control information to physical channels, and sends them to the UE over the HS-SCCH. Specifically, the first part symbol sequence is sent to the UE in time slot 1, and the second part symbol sequence is sent to the UE in time slot 2 and time slot 3.

In this embodiment, the NodeB, by adding new bits indicating layer number information to a first part of control information, and after performing corresponding rate matching processing on the control information after the new bits indicating the layer number information are added, sends a symbol sequence obtained by performing rate matching to a UE over an HS-SCCH, thereby achieving the objective of notifying the UE of layer number mapping information of a data block in multiple-antenna MIMO.

FIG. 3 is a flowchart of a method for sending control information according to Embodiment 3 of the present invention. As shown in FIG. 3, the method according to this embodiment includes the following steps.

Step 301: Increase modulation and data block information in a first part of first control information from three bits to five bits for jointly indicating a modulation scheme and layer number information, to obtain a first part of second control information, and use a second part of the first control information as a second part of the second control information.

In this embodiment, the NodeB, by adding two bits to the modulation and data block information in the first part of the first control information, changes the original three bits into five bits, and jointly indicates the modulation scheme and the layer number information by using the five bits. In this embodiment, the added two bits are recorded as xms,4 and xms,5.

The five bits of the modulation and data block information have 32 values in total. In other words, the five bits may represent 32 types of information, as shown in Table 2.

TABLE 2

| Value | Represented Information |
|---|---|
| 00000 | Information 1 |
| 00001 | Information 2 |
| 00010 | Information 3 |
| 00011 | Information 4 |
| 00100 | Information 5 |

TABLE 2-continued

| Value | Represented Information |
|---|---|
| 00101 | Information 6 |
| 00110 | Information 7 |
| 00111 | Information 8 |
| 01000 | Information 9 |
| 01001 | Information 10 |
| 01010 | Information 11 |
| 01011 | Information 12 |
| 01100 | Information 13 |
| 01101 | Information 14 |
| 01110 | Information 15 |
| 01111 | Information 16 |
| 10000 | Information 17 |
| 10001 | Information 18 |
| 10010 | Information 19 |
| 10011 | Information 20 |
| 10100 | Information 21 |
| 10101 | Information 22 |
| 10110 | Information 23 |
| 10111 | Information 24 |
| 11000 | Information 25 |
| 11001 | Information 26 |
| 11010 | Information 27 |
| 11011 | Information 28 |
| 11100 | Information 29 |
| 11101 | Information 30 |
| 11110 | Information 31 |
| 11111 | Information 32 |

In the prior art, the following specification is made for the cases where a UE uses dual-code words: a modulation scheme used by a primary transport block needs to be higher than a modulation scheme used by a secondary transport block. At present, a modulation scheme used by a data block includes QPSK, 16QAM, and 64QAM. Because it is specified that a modulation scheme used by a primary transport block needs to be higher than a modulation scheme used by a secondary transport block, three bits may be used to represent all combinations of modulation schemes. However, as the technology develops, if it is allowed that a modulation scheme used by a primary transport block is lower than or equal to a modulation scheme used by a secondary transport block, three bits will be insufficient to represent all combinations of modulation schemes. However, in this embodiment, the NodeB, by increasing the modulation and data block information from three bits to five bits, increases the amount of information to be represented, and solves the problem of representing all combinations of modulation schemes when the limitation that a modulation scheme used by a primary transport block needs to be higher than a modulation scheme used by a secondary transport block is cancelled. The following Table 3 shows an example of jointly indicating a modulation scheme and layer number information by modulation and data block information by using five bits.

TABLE 3

| Value Combinations of Five Bits of Modulation and Data Block information | Modulation Mode of Primary Transport block | Modulation Mode of Secondary Transport block | Layer Number Information |
|---|---|---|---|
| 11101 | 64QAM | 64QAM | 4 |
| 11100 | | | 3 |
| 11011 | | | 2 |
| 11010 | 64QAM | 16QAM | 4 |
| 11001 | | | 3 |
| 11000 | | | 2 |
| 10111 | 64QAM | QPSK | 4 |
| 10110 | | | 3 |
| 10101 | | | 2 |
| 10100 | 64QAM | n/a | 1 |
| 10011 | 16QAM | 64QAM | 4 |
| 10010 | | | 3 |
| 10001 | | | 2 |
| 10000 | 16QAM | 16QAM | 4 |
| 01111 | | | 3 |
| 01110 | | | 2 |
| 01101 | 16QAM | QPSK | 4 |
| 01100 | | | 3 |
| 01011 | | | 2 |
| 01010 | 16QAM | n/a | 1 |
| 01001 | QPSK | 64PSK | 4 |
| 01000 | | | 3 |
| 00111 | | | 2 |
| 00110 | QPSK | 16PSK | 4 |
| 00101 | | | 3 |
| 00100 | | | 2 |
| 00011 | QPSK | QPSK | 4 |
| 00010 | | | 3 |
| 00001 | | | 2 |
| 00000 | QPSK | n/a | 1 |

The NodeB uses the first part to which xms,4 and xms,5 are added in the first control information as the first part of the second control information. The NodeB directly uses the second part of the first control information as the second part of the second control information.

Based on the above description, in this embodiment, the first part of the second control information includes channelization-code-set information, 5-bit modulation and data block information, and precoding weight information. A difference from the first part of the first control information lies in that the modulation and data block information has five bits in total. The second part of the second control information is the same as the second part of the first control information. If a UE uses a single-code word, the second part of the second control information includes transport-block size information, hybrid automatic repeat request process information, redundancy and constellation version, and UE identity; if the UE uses a dual-code word, the second part of the second control information includes transport-block size information for the primary transport block, transport-block size information for the secondary transport block, hybrid automatic repeat request process information, redundancy and constellation version for the primary transport block, redundancy and constellation version for the secondary transport block, and UE identity.

Step 302: Remove a first number of symbols from a coded sequence obtained by performing channel coding on the first part of the second control information, to obtain a first part symbol sequence in a symbol sequence, where the first number is a sum of the number of symbols removed from a coded sequence obtained by performing channel coding on the first part of the first control information and 2 times matching rate.

Step 303: Remove a second number of symbols from a coded sequence obtained by performing channel coding on the second part of the second control information, to obtain a second part symbol sequence in the symbol sequence, where the second number is the number of symbols removed from a coded sequence obtained by performing channel coding on the second part of the first control information.

Step 304: Send the first part symbol sequence and the second part symbol sequence of the symbol sequence to the UE over an HS-SCCH.

Reference may be made to the description of step 202 to step 204 for step 302 to step 304, which are not be described repeatedly herein.

In this embodiment, the NodeB, by increasing modulation and data block information in a first part of control information from three bits to five bits for jointly indicating layer number information and a modulation scheme, and after performing corresponding rate matching processing on the control information to which the new bits are added, sends a symbol sequence obtained by performing rate matching to a UE over an HS-SCCH, achieves the objective of notifying the UE of layer number information mapped to a data block in multiple-antenna MIMO, and also supports notification of combination information of more modulation schemes used by the data block to the UE.

FIG. 4A is a flowchart of a method for sending control information according to Embodiment 4 of the present invention. As shown in FIG. 4A, the method according to this embodiment includes the following steps.

Step 401: Add two bits for indicating layer number information to a first part of first control information, increase precoding weight information in the first part of the first control information from two bits to four bits, to obtain a first part of second control information, and use a second part of the first control information as a second part of the second control information.

In this embodiment, a NodeB adds two bits to the first part of the first control information, thereby representing the number of layers to which a data block in multiple-antenna MIMO may be mapped and a layer number to which it is mapped by using the two additional bits. In this embodiment, the added indication layer number information is recorded as xlni,1 and xlni,2. An implementation manner for representing the layer number information by using the newly added xlni,1 and xlni,2 is shown in Table 1.

In addition, a transport block (which includes a primary transport block and a secondary transport block if a UE uses a dual-code word) to be sent to a UE needs to undergo processing such as a processing process of a transport channel, spectrum spreading, and precoding, and then is sent together with a common pilot channel on a transmitting antenna to the UE. Precoding weight information comes from uplink feedback, and is determined and generated by the NodeB. As the number of transmitting antennas increases and the number of layers to which a data block is mapped increases, the number of precoding weight information will increase. Therefore, more bits may be required for representing PCI (that is, precoding weight information). As for this issue, in this embodiment, the NodeB adds two bits to the precoding weight information, that is, increases the precoding weight information from the original two bits to four bits, and represents precoding weight information by using the four bits. For example, the original two bits may represent four weight information, such as $w_1, w_2, w_3,$ and $w_4$; after it is increased to four bits, 16 weight information may be represented, which are respectively recorded as $w_1, \ldots,$ and $w_{16}$. In this embodiment, the two bits added to the precoding weight information are recorded as xpwipb,3 and xpwipb,4.

It can be seen from the above that, the NodeB, by increasing precoding weight information to four bits, is sufficient to meet a requirement of a WCDMA system for the number of weight information, and solves the problem of requiring more bits for representing PCI which arises from increasing of the number of transmitting antennas and the number of layers to which a transport block is mapped.

The NodeB uses the first part to which xlni,1, xlni,2, xpwipb,3, and xpwipb,4 are added in the first control information as the first part of the second control information. The NodeB directly uses the second part of the first control information as the second part of the second control information.

Based on the above description, in this embodiment, the first part of the second control information includes channelization-code-set information, modulation and data block information, 4-bit precoding weight information, and two bits indicating layer number information. The second part of the second control information is the same as the second part of the first control information. If a UE uses a single-code word, the second part of the second control information includes transport-block size information, hybrid automatic repeat request process information, redundancy and constellation version, and UE identity; if the UE uses a dual-code word, the second part of the second control information includes transport-block size information for the primary transport block, transport-block size information for the secondary transport block, hybrid automatic repeat request process information, redundancy and constellation version for the primary transport block, redundancy and constellation version for the secondary transport block, and UE identity.

Step 402: If the first part of the second control information uses a ⅓ rate convolutional code, remove a third number of symbols from a coded sequence obtained by performing channel coding on the first part of the second control information, to obtain a first part symbol sequence of a symbol sequence, where the third number is a sum of the number of symbols removed from a coded sequence obtained by performing channel coding on the first part of the first control information and 4 times matching rate; and if the first part of the second control information uses a ½ rate convolutional code, remove 8 symbols from a coded sequence obtained by performing channel coding on the first part of the second control information, to obtain a first part symbol sequence of a symbol sequence.

After obtaining the second control information, the NodeB respectively processes the first part and the second part of the second control information.

Specifically, the NodeB first performs channel coding on the first part of the second control information to obtain a coded sequence. The channel coding scheme used here is a convolutional coding scheme, such as a ⅓ rate convolutional coding scheme or a ½ rate convolutional coding scheme.

Then, the NodeB performs rate matching processing on the coded sequence to obtain a first part symbol sequence corresponding to the second control information, where the rate matching is to puncture data after channel coding (that is, the coded sequence in this embodiment) or to repeat the data, so that the coded sequence after rate matching may meet a requirement of the channel for the number of symbols. For example, for the HS-SCCH, 40 symbols are required after part1 and 80 symbols are required after part2; however, the coded sequence in this embodiment obviously exceeds the specified length, and puncturing processing needs to be performed. A matching rate used in rate matching processing depends on the HS-SCCH. In the embodiments of the present invention, the matching rate equals to a channel coding rate. If ⅓ rate convolutional coding is used, the matching rate is 3. If ½ rate convolutional coding is used, the matching rate is 2.

The process of performing rate matching on the coded sequence of the first part of the second control information is similar to the process of performing rate matching on the coded sequence of the first part of the first control information, that is, to remove or puncture partial symbols from the coded sequence of the first part of the second control information. However, compared with the first part of the first control information, four bits (two bits indicating layer number information and two bits added to the precoding weight information) are added to the first part of the second control information; therefore, to ensure that the symbol sequence obtained by performing rate matching meets the requirement of the HS-SCCH for the number of symbols, if a ⅓ rate convolutional code is used, compared with the process of performing rate matching on the coded sequence of the first part of the first control information, when performing rate matching on the coded sequence of the first part of the second control information, 4*3=12 more symbols need to be removed (in other words, 12 more symbols need to be punctured). That is, if n symbols need to be punctured from the coded sequence of the first part of the first control information, (n+12) symbols need to be punctured from the coded sequence of the first part of the second control information. In the embodiments of the present invention, the number (n+12) is recorded as a third number, where the third number is a sum of the number of symbols removed in the process of performing rate matching on the coded sequence of the first part of the first control information and 4 times matching rate.

If a ½ rate convolutional code is used, when performing rate matching on the coded sequence of the first part of the second control information, eight symbols need to be removed (in other words, eight symbols need to be punctured).

In this embodiment, if a ⅓ rate convolutional code is used, no limitation is set to symbols which are specifically removed by the NodeB from the coded sequence of the first part of the second control information as long as symbols of the third number are removed. This embodiment provides an exemplary implementation manner, which specifically is: the NodeB removes symbols 1, 2, 4, 6, 8, 10, 12, 15, 18, 21, 24, 27, 30, 33, 36, 39, 41, 43, 46, 49, 51, 53, 55, 57, 59, 61, 63, 65, 67, 69, 71, and 72 from the coded sequence obtained by performing channel coding on the first part of the second control information, to obtain a first part symbol sequence shown in FIG. 4B. If the coded sequence of the first part of the second control information is recorded as $z_{1,1}, z_{1,2}, \ldots, z_{1,72}$, the NodeB punctures $z_{1,1}, z_{1,2}, z_{1,4}, z_{1,6}, z_{1,8}, z_{1,12}, z_{1,15}, z_{1,18}, z_{1,21}, z_{1,24}, z_{1,27}, z_{1,30}, z_{1,33}, z_{1,36}, z_{1,39}, z_{1,41}, z_{1,43}, z_{1,46}, z_{1,49}, z_{1,51}, z_{1,53}, z_{1,55}, z_{1,57}, z_{1,59}, z_{1,61}, z_{1,63}, z_{1,65}, z_{1,67}, z_{1,69}, z_{1,71}$, and $z_{1,72}$.

If a ½ rate convolutional code is used, no limitation is set to symbols which are specifically removed by the NodeB from the coded sequence of the first part of the second control information as long as 8 symbols are removed. This embodiment provides an exemplary implementation manner, which specifically is: the NodeB removes symbols 1, 2, 4, 8, 42, 45, 47, and 48 from the coded sequence obtained by performing channel coding on the first part of the second control information, to obtain a first part symbol sequence shown in FIG. 4C. If the coded sequence of the first part of the second control information is recorded as $z_{1,1}, z_{1,2}, \ldots, z_{1,48}$, the NodeB punctures $z_{1,1}, z_{1,2}, z_{1,4}, z_{1,8}, z_{1,42}, z_{1,45}, z_{1,47}$, and $z_{1,48}$.

Step 403: Remove a second number of symbols from a coded sequence obtained by performing channel coding on the second part of the second control information, to obtain a second part symbol sequence in a symbol sequence.

Specifically, the NodeB first adds CRC information to the second part of the second control information, so that the UE performs CRC on received control information. CRC information is 16 bits. Then, the NodeB performs channel coding on the second part of the second control information to which the CRC information is added, to obtain a coded sequence. A channel coding scheme which is used is a convolutional coding scheme, such as a ⅓ convolutional coding scheme.

Then, the NodeB performs rate matching on the coded sequence to obtain the second part symbol sequence. The process of performing rate matching on the coded sequence of the second part of the second control information is the same as the process of performing rate matching on the coded sequence of the second part of the first control information, that is, the number of symbols removed or punctured and positions of the symbols removed or punctured from the coded sequence of the second part of the second control information are the same as those of the second part of the first control information, which is not described repeatedly herein.

In this embodiment, the second number is also the number of symbols removed from the coded sequence of the second part of the first control information in the process of performing rate matching on the coded sequence of the second part of the first control information.

Step 404: Send the first part symbol sequence and the second part symbol sequence of the symbol sequence to a UE over an HS-SCCH.

Reference may be made to the description of step 204 for this step, which is not described repeatedly herein.

In this embodiment, the NodeB, by adding new bits indicating layer number information to a first part of control information, and after performing corresponding rate matching processing on the control information after the new bits indicating the layer number information are added, sends a symbol sequence obtained by performing rate matching to a UE over an HS-SCCH, thereby achieving the objective of notifying the UE of layer number mapping information of a data block in multiple-antenna MIMO. In addition, the NodeB, by increasing the number of bits of precoding weight information, solves the problem of requiring more bits for representing PCI which arises from increasing of the number of transmitting antennas and the number of layers to which a transport block is mapped, and allows the NodeB to perform precoding processing on a data block by using more weight information.

FIG. 5 is a flowchart of a method for sending control information according to Embodiment 5 of the present invention. As shown in FIG. 5, the method according to this embodiment includes the following steps.

Step 501: Increase modulation and data block information in a first part of first control information from three bits to five bits for jointly indicating a modulation scheme and layer number information, and increase precoding weight information in the first part of the first control information from two bits to four bits, to obtain a first part of second control information, and use a second part of the first control information as a second part of the second control information.

In this embodiment, the NodeB, by adding two bits to the modulation and data block information in the first part of the first control information, changes the original three bits into five bits, and jointly indicates the modulation scheme and the layer number information by using the five bits. In this embodiment, the added two bits are recorded as xms,4 and xms,5.

The five bits of the modulation and data block information have 32 values in total. In other words, the five bits may represent 32 types of information, as shown in Table 2.

In the prior art, the following specification is made for the cases where a UE uses dual-code streams: a modulation scheme used by a primary transport block needs to be higher than a modulation scheme used by a secondary transport block. At present, a modulation scheme used by a data block includes QPSK, 16QAM, and 64QAM. Because it is specified that a modulation scheme used by a primary transport block needs to be higher than a modulation scheme used by a secondary transport block, three bits may be used to represent all combinations of modulation schemes. However, as the technology develops, if it is allowed that a modulation scheme used by a primary transport block is lower than or equal to a modulation scheme used by a secondary transport block, three bits will be insufficient to represent all combinations of modulation schemes. However, in this embodiment, the NodeB, by increasing the modulation and data block information from three bits to five bits, increases the amount of information to be represented, and solves the problem of representing all combinations of modulation schemes when the limitation that a modulation scheme used by a primary transport block needs to be higher than a modulation scheme used by a secondary transport block is cancelled. An example of jointly indicating a modulation scheme and layer number information by using the five bits is shown in Table 3.

In addition, a transport block (which includes a primary transport block and a secondary transport block if a UE uses a dual-code word) to be sent to a UE needs to undergo processing such as a processing process of a transport channel, spectrum spreading, and precoding, and then is sent together with a common pilot channel on a transmitting antenna to the UE. Precoding weight information comes from uplink feedback, and is determined and generated by the NodeB. As the number of transmitting antennas increases and the number of layers to which a data block is mapped increases, the number of precoding weight information will increase. Therefore, PCI (that is, precoding weight information) may require more bits for representing the same. As for this issue, in this embodiment, the NodeB adds two bits to the precoding weight information, that is, increases the precoding weight information from the original two bits to four bits, and represents precoding weight information by using the four bits. For example, the original two bits may represent four weight information, such as $w_1$, $w_2$, $w_3$, and $w_4$; after it is increased to four bits, 16 weight information may be represented, which are respectively recorded as $w_1, \ldots, w_{16}$. In this embodiment, the two bits added to the precoding weight information are recorded as xpwipb,3 and xpwipb,4.

It can be seen from the above that, the NodeB, by increasing precoding weight information to four bits, is sufficient to meet a requirement of a WCDMA system for the number of weight information, and solves the problem of requiring more bits for representing PCI which arises from increasing of the number of transmitting antennas and the number of layers to which a transport block is mapped.

The NodeB uses the first part to which xms,4, xms,5, xpwipb,3, and xpwipb,4 are added in the first control information as the first part of the second control information. The NodeB directly uses the second part of the first control information as the second part of the second control information.

Based on the above description, in this embodiment, the first part of the second control information includes channelization-code-set information, 5-bit modulation and data block information, and 4-bit precoding weight information. The second part of the second control information is the same as the second part of the first control information. If a UE uses a single-code word, the second part of the second control information includes transport-block size information, hybrid automatic repeat request process information, redundancy and constellation version, and UE identity; if the UE uses a dual-code word, the second part of the second control information includes transport-block size information for the primary transport block, transport-block size information for the secondary transport block, hybrid automatic repeat request process information, redundancy and constellation version for the primary transport block, redundancy and constellation version for the secondary transport block, and UE identity.

Step 502: If a ⅓ rate convolutional code is used, remove a third number of symbols from a coded sequence obtained by performing channel coding on the first part of the second control information, to obtain a first part symbol sequence of a symbol sequence; and if a ½ rate convolutional code is used, remove eight symbols from a coded sequence obtained by performing channel coding on the first part of the second control information, to obtain a first part symbol sequence of a symbol sequence.

In this embodiment, the third number is also a sum of the number of symbols removed from the coded sequence obtained by performing channel coding on the first part of the first control information and 4 times matching rate in a rate matching process.

Step 503: Remove a second number of symbols from a coded sequence obtained by performing channel coding on the second part of the second control information, to obtain a second part symbol sequence in a symbol sequence.

In this embodiment, the second number is also the number of symbols removed from the coded sequence of the second part of the first control information in the process of performing rate matching on the coded sequence of the second part of the first control information.

Step 504: Send the first part symbol sequence and the second part symbol sequence of the symbol sequence to a UE over an HS-SCCH.

Reference may be made to the description of step 402 to step 404 for step 502 to step 504, which are not described repeatedly herein.

In this embodiment, the NodeB, by increasing modulation and data block information in a first part of control information from three bits to five bits for jointly indicating layer number information and a modulation scheme, and after performing corresponding rate matching processing on the control information to which the new bits are added, sends a symbol sequence obtained by performing rate matching to a UE over an HS-SCCH, achieves the objective of notifying the UE of layer number information mapped to a data block in multiple-antenna MIMO, and also supports notification of combination information of more modulation schemes used by the data block to the UE. In addition, the NodeB, by increasing the number of bits of precoding weight information, solves the problem of requiring more bits for representing PCI which arises from increasing of the number of transmitting antennas and the number of layers to which a transport block is mapped, and allows the NodeB to perform precoding processing on a data block by using more weight information.

Figure 6:
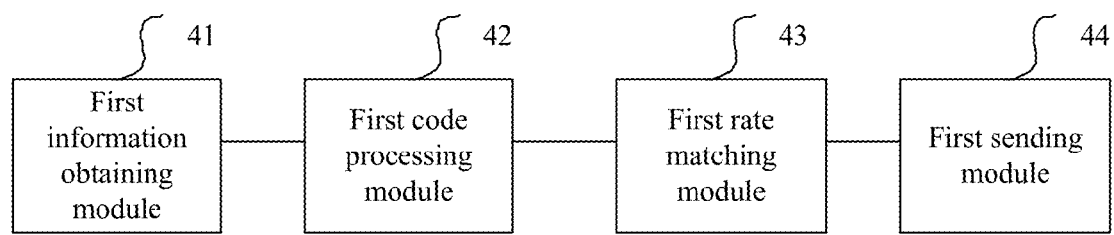
FIG. 6 is a schematic structural diagram of a base station according to Embodiment 6 of the present invention.

FIG. 6 is a schematic structural diagram of a base station according to Embodiment 6 of the present invention. As shown in FIG. 6, in this embodiment, the base station includes a first information obtaining module 41, a first code processing module 42, a first rate matching module 43, and a first sending module 44.

The first information obtaining module 41 is configured to add bit information indicating layer number information to first control information, to obtain second control information. The first code processing module 42 is connected to the first information obtaining module 41, and is configured to perform channel coding on the second control information obtained by the first information obtaining module 41, to obtain a coded sequence. The first rate matching module 43 is connected to the first code processing module 42, and is configured to perform rate matching on the coded sequence obtained by the first code processing module 42, to obtain a symbol sequence. The first sending module 44 is connected to the first rate matching module 43, and is configured to send the symbol sequence obtained by the first rate matching module 43 to a UE over an HS-SCCH.

The base station of this embodiment may be a NodeB, but is not limited thereto.

In this embodiment, functional modules of the base station may be used to perform a flow of a method for sending control information shown in FIG. 1. A specific work principle thereof is not described repeatedly, and reference may be made to the description of the method embodiment.

In this embodiment, the base station, by adding bit information indicating layer number information to control information, and performing channel coding, rate matching, and the like on the control information to which the bit information indicating the layer number information is added, obtains a symbol sequence, and then sends the obtained symbol sequence to a UE over an HS-SCCH, thereby notifying the UE of the layer number information, and laying a foundation for implementing a multiple-antenna MIMO technology.

Further, the first information obtaining module 41 is specifically configured to add two bits for indicating layer number information to a first part of first control information, and increase precoding weight information in the first part of the first control information from two bits to four bits, to obtain a first part of second control information, and to use a second part of the first control information as a second part of the second control information.

The first information obtaining module 41 is further specifically configured to increase modulation and data block information in a first part of first control information from three bits to five bits for jointly indicating a modulation scheme and layer number information, and increase precoding weight information in the first part of the first control information from two bits to four bits, to obtain a first part of second control information, and to use a second part of the first control information as a second part of the second control information.

Based on the above description, if the first part of the second control information uses a ⅓ rate convolutional code, the first rate matching module 43 is configured to remove a third number of symbols from a coded sequence obtained by performing channel coding on the first part of the second control information, to obtain a first part symbol sequence in a symbol sequence; if the first part of the second control information uses a ½ rate convolutional code, the first rate matching module 43 is configured to remove eight symbols from a coded sequence obtained by performing channel coding on the first part of the second control information, to obtain a first part symbol sequence in a symbol sequence, and remove a second number of symbols from a coded sequence obtained by performing channel coding on the second part of the second control information, to obtain a second part symbol sequence in a symbol sequence; where the third number is a sum of the number of symbols removed from a coded sequence obtained by performing channel coding on the first part of the first control information and 4 times matching rate, and the second number is the number of symbols removed from a coded sequence obtained by performing channel coding on the second part of the first control information.

Persons of ordinary skill in the art may understand that all or a part of the steps in each of the foregoing method embodiments may be implemented by a program instructing relevant hardware. The program may be stored in a computer readable storage medium. When the program is run, the steps of the forgoing methods in the embodiments are performed. The storage medium includes any medium that is capable of storing program codes, such as a ROM, a RAM, a magnetic disk, or an optical disk.

Finally, it should be noted that the foregoing embodiments are merely intended for describing the technical solutions of the present invention, rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof, without departing from the scope of the technical solutions of the embodiments of the present invention.

What is claimed is:

1. A method for sending control information, the method comprising:
performing rate matching on a coded sequence obtained by performing channel coding on control information, to obtain a symbol sequence; and
sending the symbol sequence to a user equipment (UE) over a high speed shared control channel (HS-SCCH);
wherein the control information comprises a first part and a second part, the first part of the control information comprises modulation and data block information and further comprises precoding weight information, and wherein the modulation and data block information jointly indicates a modulation scheme and layer number information;
wherein the performing rate matching to obtain the symbol sequence comprises:
removing symbols 1, 2, 4, 8, 42, 45, 47, and 48 from the coded sequence obtained by performing channel coding on the first part of the control information, to obtain a first part symbol sequence in the symbol sequence when the first part of the control information uses a ½ rate convolutional code.

2. The method according to claim 1, wherein the modulation and data block information is represented by using five bits.

3. The method according to claim 1, wherein the precoding weight information is represented by using four bits.

4. The method according to claim 1, wherein the performing rate matching to obtain the symbol sequence further comprises:
removing a second number of symbols from a coded sequence obtained by performing channel coding on the second part of the control information, to obtain a second part symbol sequence in the symbol sequence, wherein the second number equals to a number of symbols removed from a coded sequence obtained by performing channel coding on a second part of first control information.

5. The method according to claim 4, wherein the second part of the control information is same as the second part of the first control information.

6. The method according to claim 4, wherein the first control information comprises modulation and data block information represented by using three bits and precoding weight information represented by using two bits.

7. The method according to claim 4, wherein the first part symbol sequence is a symbol sequence sent in time slot 1, and the second part symbol sequence is a symbol sequence sent in time slot 2 and time slot 3.

8. The method according to claim 1, wherein the control information is high speed physical downlink shared channel (HS-PDSCH) control information.

9. The method according to claim 1, wherein the control information corresponds to one transport block or two transport blocks.

10. A base station, comprising:
a coder, configured to perform channel coding on control information to obtain a coded sequence;
a processor, configured to perform rate matching on the coded sequence to obtain a symbol sequence; and
a transmitter, configured to send the symbol sequence to a user equipment (UE) over a high speed shared control channel (HS-SCCH);
wherein the control information comprises a first part and a second part, wherein the first part of the control information comprises modulation and data block information and further comprises precoding weight information, and wherein the modulation and data block information jointly indicates a modulation scheme and layer number information;
wherein the processor is configured to perform rate matching on the coded sequence comprises: the processor is configured to remove symbols 1, 2, 4, 8, 42, 45, 47, and 48 from the coded sequence obtained by performing channel coding on the first part of the control information, to obtain a first part symbol sequence in the symbol sequence when the first part of the control information uses a ½ rate convolutional code.

11. The base station according to claim 10, wherein the modulation and data block information is represented by using five bits.

12. The base station according to claim 10, wherein the coder is further configured to perform channel coding on the second part of the control information;
the processor is further configured to remove a second number of symbols from a coded sequence obtained by performing channel coding on the second part of the second control information, to obtain a second part symbol sequence in the symbol sequence, the second number equals to a number of symbols removed from a coded sequence obtained by performing channel coding on a second part of first control information.

13. The base station according to claim 10, the precoding weight information is represented by using four bits.

14. The base station according to claim 12, wherein the second part of the control information is same as the second part of the first control information.

15. The base station according to claim 12, wherein the first control information comprises modulation and data block information represented by using three bits and precoding weight information represented by using two bits.

16. The base station according to claim 12, wherein the transmitter is configured to send the first part symbol sequence in time slot 1, and to send the second part symbol sequence in time slot 2 and time slot 3.

17. The base station according to claim 10, wherein the control information is high speed physical downlink shared channel (HS-PDSCH) control information.

18. The base station according to claim 10, wherein the control information corresponds to one transport block or two transport blocks.

* * * * *